United States Patent [19]
Monte

[11] Patent Number: 5,948,452
[45] Date of Patent: Sep. 7, 1999

[54] PROCESS FOR PRODUCING LOW PH BY-PRODUCTS FROM WASTE PRODUCTS OF CHEESE PRODUCTION

[76] Inventor: Woodrow C. Monte, 6411 S. River Dr., No. 61, Tempe, Ariz. 85293

[21] Appl. No.: 09/145,311

[22] Filed: Aug. 31, 1998

[51] Int. Cl.⁶ .............................. A23C 9/12; A23C 21/02; A23C 21/06; A23C 21/08

[52] U.S. Cl. .................................. 426/41; 426/34; 426/36; 426/39; 426/583

[58] Field of Search ................................. 426/34, 36, 41, 426/39, 583

[56] References Cited

U.S. PATENT DOCUMENTS

| | | | |
|---|---|---|---|
| 4,711,953 | 12/1987 | Roger et al. | 530/366 |
| 4,771,001 | 9/1988 | Bailey et al. | 435/139 |
| 5,186,971 | 2/1993 | Girsh | 426/580 |
| 5,401,523 | 3/1995 | Degen et al. | 426/580 |
| 5,413,804 | 5/1995 | Rhodes | 426/583 |
| 5,614,241 | 3/1997 | Monte | 426/532 |

*Primary Examiner*—Keith D. Hendricks
*Attorney, Agent, or Firm*—Tod R. Nissle, P.C.

[57] ABSTRACT

A process for producing pampered whey protein. The pH of whey protein is carefully controlled and maintained substantially constant during processing to produce a protein resistance to precipitation during sterilization.

4 Claims, 2 Drawing Sheets

PROCESS FOR PRODUCING LOW PH BY-PRODUCTS FROM WASTE PRODUCTS OF CHEESE PRODUCTION

This invention relates to a process for producing pampered whey protein.

More particularly, the invention relates to a process for producing useful low pH compositions from waste products during cheese production.

In another respect, the invention relates to processes for producing cheese.

In a further respect, the invention relates to a biunial bivariant process for producing cheese which during the process maintains a low pH during the processing to enhance the stability and resistance to precipitation of proteins.

In still another respect, the invention relates to a biunial process for producing a heat stable protein composition which can be utilized in food processing.

In still a further respect, the invention relates to a biunial process for producing cheese in which a biramous bipolar bivariant process is used first to lower the lactose concentration in an efferent process and second to increase the protein concentration in an afferent process while maintaining a relatively constant low pH in solutions utitlized in the efferent and afferent processes.

In yet still a further respect, the invention relates to a process for producing an aqueous solution of an undenatured protein which can be utilized in the manufacture of various food products.

During the production of cheese, a starter culture is introduced in heated milk to increase the acidity of the milk and form a sour milk culture. During the production of cheese phosphoproteins in the form of cream colored curd is produced and precipitated when milk is curdled by rennet. The curd is cut to facilitate escape of whey from the curd. The whey is then drained from the curd to form a waste stream which is mostly water and also contains lactose, minerals, and albumin. The waste stream is discarded or is processed to produce dry powder lacotse and protein concentrate.

I have discovered an improved biunial process for making cheese which utilizes a biramous bipolar process which reduces the likelihood that albumin will be denatured and increases the likelihood that the albumin will not precipitate if sterilized in various cheese, milk, and other food processes. The biramous bipolar process utilizes an efferent process to produce an albumin concentrate by maintaining the albumin continuously in a pH—stable liquid environment to minimize any denaturization of the albumin.

Briefly, in accordance with my invention, I provide an improved bivariant cheese process. The process includes the steps of providing a supply of milk; increasing the acidity of the milk to a pH in the range of about 4.3 to 6.0 to form an sour milk mixture; adding enzymes to the sour milk for form curd; separating whey from the curd, the whey having a pH in the range of about 4.3 to 6.0 and including lactose, water, minerals, and albumin; providing a first membrane which generally prevents albumin from passing through the membrane and which permits at least 30% by weight of the total weight percent of lactose and minerals in the whey to pass therethrough; and, directing the whey through the membrane under pressure to produce a first acidic membrane retentate comprised of components which do not pass through the membrane.

The pH of the retentate is, as it is produced at the membrane, continuously adjusted to a desired final pH range. This pH range can include the pH of a finished product in which the retentate will be utilized, and can be a selected pH range which does not include the pH of the finished product. The pH of the retentate must be continuously adjusted to compensate for disproportionate loss of hydrogen ions through the membrane. The pH of retentate is not allowed to range above 6.0, and preferably is maintained in the range of 4.3 to 6.0. The retentate includes at least the majority of the albumin.

Application of the whey stream against the membrane under pressure also also produces a first acidic membrane permeate comprised of components which do pass through the membrane. The permeate including at least 30% of the lactose in the whey; maintaining the pH during the passage of the whey through the membrane such that the pH of the retentate is substantially equal to the pH of the whey. The retentate can be filtered through a sequence of membranes until the lactose content is reduced to acceptable levels. Ordinarily, the concentration of lactose in a final food product in which the retentate is utilized will be in the range of 0.001% to 0.05% by weight.

A micromembrane can be provided which permits albumin to pass therethrough. The retentate is directed through the micromembrane under pressure to produce a second retentate and a second permeate. The second permeate includes the majority of albumin in the first retentate. The second retentate can be heated at an elevated temperature or otherwise processed and combined with the second permeate.

In accordance with another embodiment of my invention, I provide an improved bivariant biunial cheese process. The process includes the steps of providing a supply of milk; increasing the acidity of the milk to a pH in the range of about 4.3 to 6.0 to form an sour milk mixture; adding enzymes to the sour milk for form curd; separating whey from the curd, the whey having a pH in the range of about 4.3 to 6.0 and including lactose, water, minerals, and albumin; providing a first membrane which generally prevents albumin from passing through the membrane and which permits at least 30% by weight of the total weight percent of lactose and minerals in the whey to pass therethrough; directing the whey through the membrane under pressure to produce a first acidic membrane retentate comprised of components which do not pass through the membrane, the retentate having a pH in the range of 4.3 to 6.0 including at least the majority of the albumin, and to produce a first acidic membrane permeate comprised of components which do pass through the membrane, the permeate including at least 30% of the lactose in the whey; maintaining the pH during the passage of the whey through the membrane such that the pH of the retentate is equal to the pH of the whey; providing a second membrane which prevents albumin from passing therethrough; directing the first retentate through said second membrane under pressure to produce a second retentate including a greater concentration of albumin that the first retentate; and, maintaining the pH during the passage of the first retentate through the second membrane such that the pH of the second retentate is equal to the pH of the first retentate.

In accordance with a further embodiment of my invention, I provide an improved bivariant biunial whey treatment process. The process includes the steps of providing a supply of whey, the whey having a pH in the range of about 4.3 to 6.0 and including lactose, water, minerals, and albumin; providing a first membrane which generally prevents albumin from passing through the membrane and which permits at least 30% by weight of the total weight percent of lactose and minerals in the whey to pass therethrough; directing the whey through the membrane under pressure to produce a first acidic membrane retentate comprised of components which do not pass through the membrane, the retentate having a pH in the range of 4.3 to 6.0 including at least the majority of the albumin, and to produce a first acidic membrane permeate comprised of components which do pass through the membrane, the permeate including at least 30% of the lactose in the whey; adding an acidic composition during the passage of the whey through said first membrane means to lower the pH of said retentate; providing a second membrane to concentrate albumin; directing the first retentate through the second membrane under pressure to produce a liquid composition including a greater concentration of albumin that the first retentate; and, adding an acidic composition during the passage of said first retentate through the second membrane to lower the pH of the liquid composition. Supplements can be added to the liquid composition to produce a liquid anti-microbial protein composition. The concentration of albumin in the liquid composition is great enough such that when the supplements are added to the secondary retentate the concentration of albumin in the resulting anti-microbial protein composition is less than the concentration of albumin in the liquid composition and is in the range of about 0.5 to 12.0 percent by weight.

Figure 1:
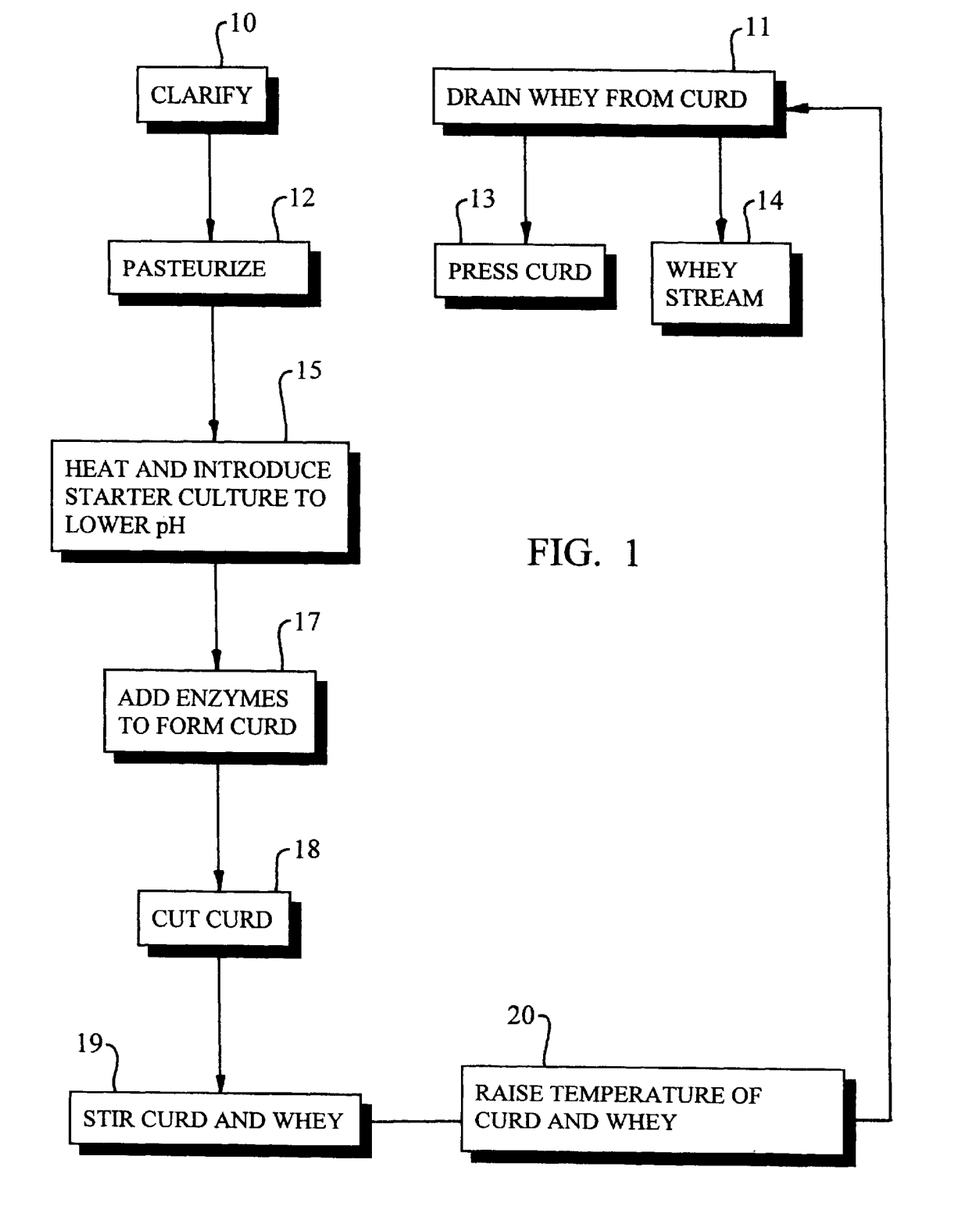
FIG. 1 is a flow chart illustrating a process for producing cheese in accordance with the principles of the invention; and, FIG. 2 is flow chart illustrating the processing of a waste stream produced during the manufacture of cheese.

Turning now to the drawings, which depict the presently preferred embodiments of the invention for purposes of illustrating the invention and not by way of limitation of the scope of the invention, FIG. 1 illustrates a biunial cheese making process in accordance with the principles of the invention.

While the invention will be explained with reference to FIGS. 1 and 2 herein, it is understood that the cheese making process can vary depending on the cheese being made. Fresh cheeses comprises three basic groups. Group I includes ricotta and Broccio. Group II includes cottage, Neuchatel, and cream. Group III includes mozzarella. Ricotta is typically made from acidified whole milk heated to about 176 degrees F. Cottage cheese ordinarily is made from skim milk. Curd forms when increasing latctic acid reach the isoelectric point of casein at a pH of about 4.6. Mozzarella typically is made from pasteurized whole milk.

Ripened cheese includes six basic groups. Group I includes Cheddar and Monterey. Group II includes Swiss and Gruyere. Group III includes Edam and Gouda. Group IV includes Muenster, brick and Limburger. Group V includes provolone. Group VI includes Camembert, Brie, and blue. By way of example, the curds for Cheddar and Monterey are formed at about 88 degrees F. by 200 ml of rennet in 2200 lb of underheated whole milk previously inoculated with 102% lactic type starter for 15 to 30 minutes.

Returning to FIG. 1 to illustrate, without limitation, a process in accordance with the invention, milk is inspected and clarified to remove any solid components in the milk. Clarified milk is then heated to pasteurize 12 the milk, after which the milk is heated 15 preparatory to introducing a starter culture. The starter culture includes bacteria or enzymes that form acids and turn the milk sour. A vegetable dye can be added along with the starter culture to turn the milk a desired color. The starter culture and dye are stirred into the milk for a desired period of time, typically about fifteen to ninety minutes. An enzyme, usually rennet or pepsin, is then added 17 to the milk to cause it to thicken and form curd. Any other desirable enzyme can be utilized. After the enzyme is blended or stirred into the milk, the milk is allowed to stand so curd forms. While the length of time the milk is allowed to stand can vary, thirty minutes is often sufficient for the curd to form. The curd is cut 18 into pieces to permit whey to ooze out of the curd. The curd and whey are stirred 19. The temperature of the curd and whey is raised 20 to a selected temperature. The heat and motion cause more whey to exude from the curd. The whey is drained 11 from the curd as a waste whey stream 14, or, the curd is lifted from the whey before the whey travels into a waste whey stream. The curd can, if desired, be pressed 13 for a few hours to a few days. Or, in the case of cottage cheese, the curd is not pressed but is washed and blended with a viscous salted creaming dressing to add fat and salt. If the curd is pressed, the cheese normally is wrapped and aged. After pressing and prior to wrapping, the cheese can, if desired, be permitted to dry to form a rind. During packaging, the cheese can be sliced and wrapped in foil or plastic.

Figure 2:
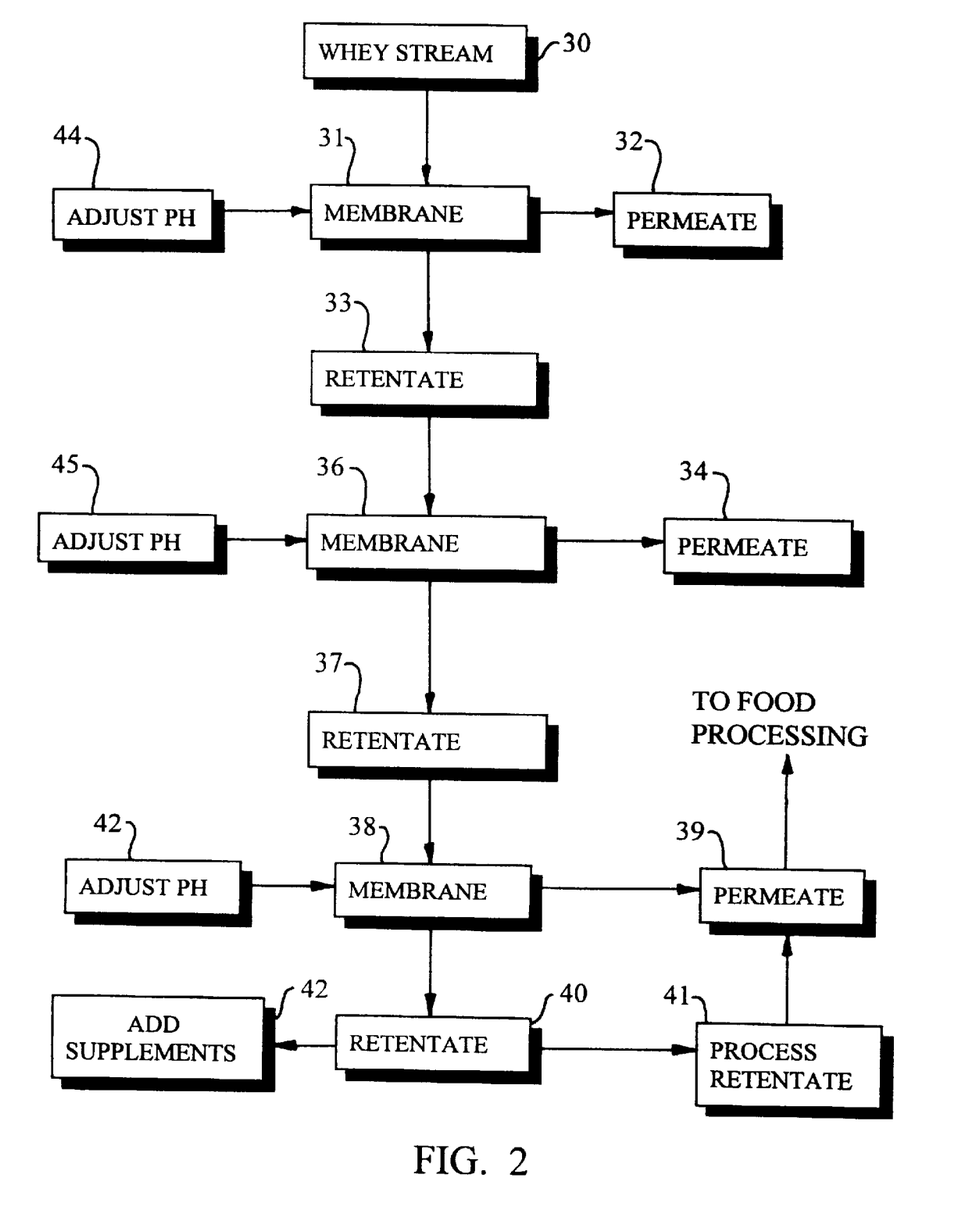

Processing of the waste whey stream 30 is illustrated in FIG. 2. The whey stream 30 has a pH of about 4.6 and consists mostly of water. The whey stream also includes lactose, minerals and some albumin. The whey stream is subjected to biramous bipolar processing by forcing the whey stream under pressure through a membrane unit including a membrane(s) 31. The membrane is a polysulfone or comparable polymeric membrane which typically prevents the passage of components having a molecular weight greater than about 10,000. The porosity of the membrane can be varied to prevent the passage of components having a molecular weight greater than a particular selected value. The membrane(s) 31 can, by way of example and not limitation, be in four different types of membrane units: a large tube unit, a flat element unit, a spiral unit, and a hollow fiber unit. Regardless of the unit utilized, in the afferent portion of the bipolar biramose process, a portion of the whey stream passes through the membrane(s) to form permeate, and, in the efferent portion of the process the remaining portion of the whey stream bypasses and does not flow through the membrane and comprises retentate. About one-half of the whey stream passes through the membrane and exits the membrane unit to comprise permeate 32, while the other half of the whey stream does not pass through the membrane and exits the membrane unit to comprise the retentate 33. The proportion of the whey stream which passes through the membrane can, however, be varied as desired.

Presently, during the afferent portion of the process, whey stream components having a molecular weight of about 10,000 or greater will not pass through the membrane and will remain in the retentate. During the efferent portion of the process, whey stream components having a molecular weight less than about 10,000 can pass through the membrane to comprise a portion of the permeate. If about one-half of the whey stream flows through the membrane then about one-half of the lactose in the whey stream also flows through the membrane into the permeate. If about one-half of the whey stream flows through the membrane then most of the albumin in the whey stream does not pass through the membrane and is found in the retentate. Some of the minerals in the whey stream flow through the membrane and are found in the retentate. Some of the minerals in the whey stream do not pass through the membrane 11 and are found in the retentate. The pH of the retenate is 4.7 to 5.0, typically 4.7 to 4.8. The pH of the permeate is 4.0 to 4.5, typically 4.3 to 4.4.

Minor effective amounts of an acidic titrating composition (a liquid, powder, etc.), for example a solution of phosphoric acid having a pH of 4.5 or less, is utilized 44 to maintain the pH of the retentate preferably at substantially the same level as the whey. The pH is maintained at substantially the same level if maintain with plus or minus one of the pH of the whey. Consequently, if the pH of the whey is 4.6, the pH of the retentate is in the range of 4.5 to 4.7. The pH of the retentate is, however, preferably maintained with about 0.5 of the pH of the whey. This means that if the pH of the whey is 4.6, then the phosphoric acid solution is utilized to insure that the pH of the retentate is in the range of about 4.5 to 4.6. Maintaining the pH of the retentate near the pH of the whey is believed important in the practice of the invention because it helps prevent the albumin from destabilizing and precipitating or denaturing. The acidic composition can be added 44 to retentate near the membrane because the membrane permits the passage of acid and tends to promote an increase in pH of the retentate. Or, the acidic composition can be added downstream after the retentate leaves the membrane. It is preferred that the acidic composition be added as soon as possible to prevent a pH change in the retentate or to minimize the amount of time that the retentate has a higher pH.

Although retentate 33 has a pH of 4.6 (due to utilization of the acidic titrating composition described above), water with a pH of 4.6 is added to the retentate 33 to dilute the retentate while maintaining the pH of the retentate at 4.6. The diluted retentate is directed through a polysulfone membrane 36 to repeat the efferent and afferent portions of the bipolar process to produce permeate 34 and retentate 37, respectively. If desired, the retentate 37 can, for as many cycles as desired, again 43 be diluted with a low pH liquid and directed through membrane 36 to repeat the efferent and afferent portions of the bipolar process. Passage of the whey stream 30 through membrane 31 and of retentate through membrane 36 is utilized to remove lactose into permeate 32, 34 while maintaining the majority of albumin in retentate 33 and 37.

Retentate 37 is, typically without diluting retentate 37 (apart from any acidic titrating composition utilized 42 to maintain the pH of the retentate 40 at pH 4.6), directed through membrane 38 during secondary afferent and efferent portions of the process to produce retentate 40 and permeate 39. Such passage of retentate 37 through membrane 38 serves to produce a retentate 38 having a concentration of albumin greater than that found in retentate 37. Retentate 47 can, without being diluted (except for any acidic composition utilized to maintain the pH of retentate 47 at 4.6), be recycled 47 back through membrane 38 or another comparable membrane multiple times to increase the concentration of albumin in retentate 40. Or, the concentration of albumin in retentate 40 can be increased utilizing a cellulose acetate or other comparable membrane which generally permits only water to pass. Or, a micromembrane can be utilized which permits protein to pass but not fat, casein, and insoluble salts. Regardless of which membrane is utilized to increase the concentration of protein in retentate or permeate, it is critical in the practice of the invention to carefully maintain at a selected level the pH of the liquid which contains albumin.

If retentate 37 is passed through a membrane 38 which is a micromembrane, the micromembrane permits albumin to pass through the membrane in the permeate 39 and retains fats, casein (if any), and insoluble salts in the retentate 40. The retentate can be heated (For example, to 300 degrees F. for about two seconds). The heated retentate 40 is then blended with the albumin rich permeate to produce a composition which can be used in milk and cheese processing or in the production of other food products.

Various liquid and solid nutritional and other supplements can be added 42 to retentate 40. The process of the invention is biunial because in its undenatured liquid state the process both reduces the concentration of lactose and increases the concentration of undenatured albumin. The process of the invention is bivariant because it permits variation of the concentration of lactose and of undenatured albumin. The process of the invention is biramous because it includes two branches, a first branch in which substantially sterile permeate 39 is produced and second branch in which a retentate 40 is produced having an increased undenatured protein concentration.

The following examples depict presently preferred embodiments of the invention for the purpose of illustrating the practice thereof and not by way of limitation of the scope of the invention. In the examples, all proportions are by weight, unless otherwise noted.

EXAMPLE 1

The whey stream 30 has a pH of 4.6. Ten thousand grams of stream 30 includes 100 gm (grams) of calcium and other minerals (1% by weight of stream 30)

200 gm of protein (2% by weight of stream 30)

600 gm of lactose (6% by weight of stream 30)

9,400 gm of water (94% by weight of stream 30).

Ten thousand grams of stream 30 is directed under pressure against polysulfone membrane 31 to bidirectionally bifurcate stream 30 and produce permeate 32 and retentate 33. While stream 30 is directed under pressure against membrane 31, small amounts of an acidic titrating solution having a pH of less than 4.6, preferably about 4.2 to 4.5, are added adjacent membrane 31 to the whey stream at locations where acid in the whey stream is passing through the membrane into the permeate. The addition of the titrating solution insures that the pH of the retentate is 4.6. If the titrating solution were not utilized, then the pH of the retentate normally would be higher than 4.6, about 4.7 to 4.8. The acidic titrating solution ordinarily includes an edible acid like phosphoric acid. Alternatively, the titrating solution can be added to the retentate after it moves away from membrane 31. Since the objective is to maintain the pH of the solution which contain albumin as constant as possible, it is preferred to add titrating solution as soon as the pH of the solution adjacent the membrane begins to increase. If desired 0.001% to 4.0% by weight of a buffer like sodium citrate can be including in the acidic titrating solution.

Permeate 32 includes components which pass through membrane 31 and generally have a molecular weight of less than about 10,000. Retentate 33 includes components which do not pass through membrane 31 and generally have a molecular weight greater than about 10,000. The permeate has a pH of 4.4 and includes about 50 gm of minerals (0.5% by weight of the permeate)

0 gm of protein 300 gm lactose (6% by weight)

4,560 gm of water (93% by weight)

The retentate 33 has a pH of about 4.6 and includes about:

50 gm minerals (0.5%)

200 gm protein (4%)

300 gm lactose (6%)

4,450 gm water (89%)

Five thousand grams of an aqueous solution of phosphoric acid with a pH of 4.6 is admixed 34 to the five thousand grams of retentate to produce ten thousand grams of a dilute retentate solution. The dilute retentate solution is directed under pressure against polysulfone membrane 36 to produce permeate 34 and retentate 37. While retentate 33 is directed under pressure against membrane 36, small amounts of an acidic titrating solution having a pH of less than 4.6, preferably about 4.2 to 4.5, are added adjacent membrane 36 to the dilute retentate solution at locations where acid in the dilute retentate solution is passing through the membrane into the permeate. The addition of the titrating solution insures that the pH of the resulting retentate 37 is 4.6.

Permeate 34 includes components which pass through membrane 36 and generally have a molecular weight of less than about 10,000. Retentate 37 includes components which do not pass through membrane 36 and generally have a molecular weight greater than about 10,000. The permeate 34 has a pH of about 4.4 and includes about 25 gm of minerals (0.5% by weight of the permeate)

0 gm of protein 150 gm lactose (3% by weight)

4,825 gm of water (96.5% by weight)

The retentate 37 has a pH of about 4.6 and includes:

25 gm minerals (0.5%)

200 gm protein (4%)

150 gm lactose (3%)

4,625 gm water a (92.5%)

Five thousand grams of an aqueous solution of phosphoric acid with a pH of 4.6 is admixed 43 to the five thousand grams of retentate 37 to produce ten thousand grams of a supplemental dilute retentate solution. The supplemental dilute retentate solution is directed under pressure against polysulfone membrane 36 to produce secondary permeate 37 and secondary retentate 34 (i.e., the steps of adding 5000 grams of low pH liquid and directing the resulting dilute supplemental retentate against membrane 36 are repeated 43, and can be repeated as many times as desired to lower further the concentration of lactose in the retentate which results from directing the supplemental retentate against membrane 36). While the supplemental dilute retentate solution is directed under pressure against membrane 36, small amounts of an acidic titrating solution having a pH of less than 4.6, preferably about 4.2 to 4.5, are again added adjacent membrane 38 to the supplemental dilute retentate at locations where acid in the whey stream is passing through the membrane into the permeate. The addition of the titrating solution insures that the pH of the resulting secondary retentate 37 is 4.6.

Secondary permeate 34 includes components which pass through membrane 36 and generally have a molecular weight of less than about 10,000. Secondary retentate 37 includes components which do not pass through membrane 35 and generally have a molecular weight greater than about 10,000. The secondary permeate 36 has a pH of 4.4 and includes about 12.5 gm of minerals (0.25% by weight of the permeate)

0 gm of protein 75 gm lactose (1.5% by weight)

4,912.5 gm of water (98.25% by weight)

The secondary retentate 37 has a pH of about 4.6 and includes:

12.5 gm minerals (0.25%)

200 gm protein (4%)

75 gm lactose (1.5%)

4,712.5 gm water a (94.25%)

The secondary retentate 37 is directed under pressure against a polysulfone membrane 38 to produce permeate 39 and retentate 40. While the secondary retentate solution 37 is directed under pressure against membrane 38, small amounts of an acidic titrating solution having a pH of less than 4.6, preferably about 4.2 to 4.5, are again added adjacent membrane 38 at locations where acid in the secondary retentate solution 37 is passing through the membrane into the permeate. The addition of the titrating solution insures that the pH of the resulting retentate 40 is 4.6.

Permeate 39 includes components which pass through membrane 38 and generally have a molecular weight of less than about 10,000. Retentate 40 includes components which do not pass through membrane 38 and generally have a molecular weight greater than about 10,000. The permeate 39 has a pH of 4.4 and includes about 6.25 gm of minerals (0.25% by weight of the permeate)

0 gm of protein 37.5 gm lactose (1.5% by weight)

2,456.25 gm of water (98.25% by weight)

The retentate 40 has a pH of about 4.6 and includes:

6.25 gm minerals (0.25%)

200 gm protein (8%)

37.5 gm lactose (1.5%)

2,256.25 gm water (90.25%)

The retentate 40 is directed 47 under pressure against polysulfone membrane 38 to produce secondary permeate 39 and secondary retentate 40 (i.e., the step of directing retentate through membrane 38 is repeated 42 and can be repeated as many times as desired to increase the concentration of albumin in the resulting retentate to a desired level). Secondary permeate 39 includes components which pass through membrane 38 and generally have a molecular weight of less than about 10,000. Secondary retentate 40 includes components which do not pass through membrane 38 and generally have a molecular weight greater than about 10,000. The secondary permeate 39 has a pH of 4.5 and includes about 3.125 gm of minerals (0.25% by weight of the permeate)

0 gm of protein 18.75 gm lactose (1.5% by weight)

1,228.125 gm of water (98.25% by weight)

The secondary retentate 40 has a pH of about 4.5 and includes:

3.125 gm minerals (0.25%)

200 gm protein (16%)

18.75 gm lactose (1.5%)

1,028.125 gm water (82.25%)

The albumin in the secondary retentate 40 is not denatured, or is only partially denatured, primarily because during processing the albumin remains in a liquid composition and because during processing the pH is maintained at a level which is less than about 6.0.

EXAMPLE 2

The secondary retentate 40 from EXAMPLE 1 is mixed with the following components to produce a liquid nutritional composition:

| Component | Grams | Weight % in Nutritional Composition |
| --- | --- | --- |
| Sugar | 524.7 | 17.49 |
| Calcium Lactate, Pentahydrate (1) | 24.9 | .83 |
| Non Dairy Creamer (Creative Creamer 829 (2) | 17.7 | .59 |
| Maltodextrin, M100 (Polysaccharides) | 16.8 | .56 |
| Citric Acid | 4.1 | .47 |
| Emulsifier (Beatreme 3581Z) (2) | 1.5 | .05 |
| Sodium Citrate | 1.2 | .04 |
| Beta Carotene, 1% Dilution CWS | 1.2 | .04 |
| Biotin | .0015 | .00005 |
| Calcium Pantothenate | .0591 | .00197 |
| Ferric Orthophosphate, Dihydrate | .2967 | .00989 |
| Folic Acid | .0021 | .00007 |
| Manganese Sulfate, Monohydrate | .0327 | .00109 |
| Niacinamide | .0948 | .00347 |
| Potassium Sorbate | 1.4979 | .04993 |
| Selenium Yeast Concentrate | .2967 | .00989 |
| Vitamin B-1 Mononitrate | .0081 | .00027 |
| Vitamin B-12 1% Dilution | .003 | .0001 |
| Vitamin B-2 Type S | .009 | .0003 |
| Vitamin B-6 HCL | .0129 | .00043 |
| Vitamin C | 1.0515 | .03505 |
| Vitamin D3, 100 S.D. | .0327 | .00109 |
| Vitamin E 50% S.D. | .3264 | .01088 |
| Zinc Sulfate, Monohydrate | .231 | .0077 |
| Flavor (Q.S.) | 4.2861 | .14287 |
| Water | 1149.6400 | 37.988 |

(1) Gallard-Schlesinger Industries, 584 Mineola Avenue, Carle Place, New York 11514; (516) 333-5600.
(2) Beatreme Foods, 352 East Grand Avenue, Beloit, Wisconsin 53511; (800) 328-7517.

In addition to the above listed components, the liquid nutitrional composition also, as noted, includes the following components from the retentate:

| Component | Grams | Weight % in Nutritional Composition |
| --- | --- | --- |
| Minerals | 3.125 | .10416 |
| Phosphoprotein | 200 | 6.6667 |
| Lactose | 18.75 | .625 |
| Water ** | 1,028.125 | 34.27083 |

** The amount of water in the retentate (1,028.125 gm) plus the amount of water added to the retentate (1149.6578 gm) together comprise 2167.7828 gm (about 72% by weight) of the resulting nutritional composition.

The carbohydrates included in the liquid nutritional composition include sucrose, dextrose, maltose, lactose, trisaccharides, tetrasaccharides, pentasaccharides, hexasaccharides, and higher saccharides. The nutritional composition has a caloric density (Cal/ml) of about 1.1, has a total Cal/Nitrogen ratio of about 160, has a pH of about 4.6, has an osmolarity of about 300, has a viscosity of about 90 to 100 centipoise, has a total acidity of about 5.80 and has particles each having a size of less than about 100 mesh. Preferably, but not necessarily, the viscosity of liquid nutritional compositions prepared in accordance with the invention is less than about 500 centipoise. The denaturization of albumin in the liquid nutritional composition is minimized because (1) such protein is provided by the retentate in at least a partial undenatured state, and (2) the pH of the liquid nutritional composition is acidic. The less albumin is denatured, the more is is that sterilization at a high temperature will not cause precipitation of the protein.

The liquid nutritional composition is sterilized, typically by heating the composition to temperatures in excess of 200 degrees F. for a short period of time, and is packaged in tetra packs, cans, or any other desired container.

The amount of water in the nutritional composition can vary from 25% to 98% by weight but preferably is from 50% to 95% by weight.

The amount of albumin or of other protein in the liquid nutritional composition can vary widely, but typically is about 0.5% to 12%, with 2% to 9% being an optimal range. Apart from the albumin found in the retentate utilized to make the nutritional composition, other protein—preferably a water soluble protein—can be added to the nutritional composition. Such other protein can be a whole protein or can be a partially hydrolyzed protein such as a protein alpha-amino acid. For purposes of the present specification, the term protein alpha-amino acids is defined to include any one or more of (a) monopeptides, dipeptides, tripeptides, and/or oligopeptides prepared by the partial hydrolysis of naturally occurring proteins or of artificially produced proteins, (b) monopeptides, dipeptides, tripeptides, and oligopeptides prepared by synthesis and comparable to such peptides prepared by the partial hydrolysis of natural or artifically produced proteins, and (c) whey protein. Protein alpha-amino acids do not include amino acids which are not linked or bonded to at least one other amino acid. In addition to or in place of protein, amino acids can be utilized in the nutritional drink of the invention. Such amino acids can be separate from one another and not bonded to linked together to form protein.

The nutritional composition contains from 5% to 36% by weight of carbohydrates. The carbohydrates may be any of the digestible carbohydrates such as dextrose, fructose, sucrose, maltose, oligosaccharides, high saccharides, or mixtures thereof, depending on usage.

Vitamins, minerals, and other trace elements can be used to supplement the food composition and for purposes of total nutritional balance. These supplements can be varied as desired but are typically equal to the RDA or greater based on 2,000 calories. Soy bran, rice bran, or other fiber polysaccharides or sources of fiber can be includes in the food composition.

Conventional coloring agents, such as the FDA colors, may be used, as well as conventional preservatives, such as BHT and BHA. BHT and BHA preserve fats.

The caloric content of the liquid nutritional composition is adjusted to any desired level up to about three calories per cubic centimeter. One half to two calories per cubic centimeter is preferred.

The osmolarity of the reconstituted food composition is in the range of 250 to 650, but preferably is in the range of 275 to 350 mOSm per liter of one calories per cubic centimeter food.

The liquid nutritional composition also includes 0.01 to 5% by weight. edible acidulants such as malic acid, acetic acid, citric acid, lactic acid, sodium acetate, fumaric acid, or an acidic salt such as sodium acetate in order to adjust the pH within the range of 2.0 to 5.0, preferably 3.0 to 4.9. The low pH of the retentate functions to reduce the amount of edible acidulants required to be added to the retentate. Edible acidulants can also be included in the acid tritrating solution utilized to maintain the pH of the retentates 33, 37, 40, which are produced during filtration through membranes 31, 36, 38.

The liquid nutritional composition includes 0.001% to 4% by weight of a sorbate or benzoate such as sorbic acid, benzoic acid, potassium sorbate, sodium sorbate, potassium benzoate, sodium benzoate, and the like. Such benzoates and sorbates are critical because at low pH values in the range of 2 to 6.5 they provide significant antimicrobial acitivity.

Total acidity equals the milliliters of a one molar NaOH aqueous solution required to neutralize the acid pH of one liter of the resulting liquid nutritional composition. The acid pH of the drink is neutralized when a pH of 7 is obtained while titrating the nutritional composition with a one molar NaOH aqueous solution. The total acidity of the liquid nutritional composition of the invention is increased by utilizing a buffer system which resists any change in the pH of the composition. In particular, the sodium citrate and/or citric acid found in the liquid nutritional composition of this Example 2 increases the total acidity of the composition. While any desired buffer system can be utilized in the practice of the invention, sodium citrate, citric acid, potassium salts, calcium salts, and/or sodium salts are, by way of example and not limitation, presently preferred. In the practice of the invention, the total acidity of the retentate derived liquid nutritional composition is greater than four, preferably is greater than five, and under the most preferred conditions is greater than 5.4. The pH of the liquid nutritional composition when the total acidity is greater than 4.0 is equal to or less than about 4.9, is preferably equal to or less than about 5.00, and under the most preferred conditions is less than about 4.9. The combination of a low pH and high total acidity is important in providing a drink which has a high antimicrobial activity.

One important advantage of using the retentate produced by maintaining a low pH and reducing the concentration of lactose is that the albumin in the retentate is less likely to be denatured and, consequently, likely does not require the use of a stabilizer system to prevent the albumin from precipitating from the liquid nutritional composition both a room temperature and at high sterilization temperatures. Another advantage of using the retentate is that a liquid nutritional composition is prepared using a continuous or substantially continuous process in which cheese is made and the waste whey stream is processed directly into a nutritional composition or into a sterile composition which can be utilized in cheese, milk, or other food processing.

Medium chain triglycerides (MCT's) utilized in the liquid nutritional composition produce a low viscosity which provide high caloric content and easily digestible compositions. The fatty acid chains of medium-chain triglycerides are predominantly between about 6 and 12 carbon atoms, and are preferably utilized in conjunction with long-chain triglycerides (LCT's) in which fatty acid chains are predominately between about 14 to 26 carbon atoms.

The size of particles in the liquid nutritional composition of the invention is important. Particles in the nutritional composition generally are each equal to or less than 100 mesh in size. Since particulate in the nutritional composition preferably remains in suspension, the particulate size preferably (but not necessarily) is small.

EXAMPLE 3

The secondary retentate 40 from EXAMPLE 1 is mixed with the following components to produce a liquid nutritional composition:

| Component | Grams | Weight % in Nutritional Composition |
|---|---|---|
| Sugar | 84 | 1.2 |
| Calcium Lactate, Pentahydrate (4) | 56.7 | .81 |
| Non Dairy Creamer (Creative Creamer 829 (1) | 84 | 1.2 |
| Maltodextrin, M100 (agglomerated) | 896 | 12.8 |
| Citric Acid | 13.6 | .48 |
| Emulsifier (Beatreme 3581Z) (2) | 3.36 | .048 |
| Sodium Citrate | 3.26 | .0466 |
| Vitamin Premix (Vitamins A, D, C, K, etc.) | 3.36 | .048 |
| Magnesium Oxide | 2.8 | .040 |
| Potassium Sorbate | 7.14 | .102 |
| Water | 4565.795 | 65.0685 |

In addition to the above listed components, the liquid nutitrional composition also, as noted, includes the following components from the retentate:

| Component | Grams | Weight % in Nutritional Composition |
|---|---|---|
| Minerals | 3.125 | .0446 |
| Phosphoprotein | 200 | 2.8570 |
| Lactose | 18.75 | .2678 |
| Water ** | 1,028.125 | 14.6875 |

** The amount of water in the retentate (1,028.125 gm) plus the amount of water added to the retentate (4565.54 gm) together comprise 5593.665 gm (about 80% by weight) of the resulting nutritional composition. The carbohydrates included in the liquid nutritional composition composition include sucrose, dextrose, maltose, lactose, trisaccharides, tetrasaccharides, pentasaccharides, hexasaccharides, and higher saccharides. The nutritional drink has a caloric density (Cal/ml) of about 1.0, has a pH of about 4.6, has an osmolarity of about 300, has a viscosity of about 250 centipoise, has a total acidity of about 5.85, and has particles each having a size of less than about 100 mesh.

EXAMPLE 4

One hundred grams of the liquid nutritional composition of EXAMPLE 2 is placed in a glass beaker and is allowed to stand at room temperature. After six hours particulate has not begun to separate out of the solution to form a layer of material at the bottom of the beaker.

EXAMPLE 5

One hundred grams of the liquid nutritional composition of EXAMPLE 3 is placed in a glass beaker and is allowed to stand at room temperature. After six hours particulate has not begun to separate out of the solution to form a layer of material at the bottom of the beaker.

EXAMPLE 6

One hundred grams of the liquid nutritional composition of EXAMPLE 2 is placed in a glass beaker and is heated to and remains at a temperature of 220 degrees F. for five (5) minutes. During the five minute period, precipitate does not form and fall to the bottom of the beaker.

EXAMPLE 7

One hundred grams of the liquid nutritional composition of EXAMPLE 3 is placed in a glass beaker and is heated to and remains at a temperature of 220 degrees F. for five (5) minutes. During the five minute period, precipitate does not form and fall to the bottom of the beaker.

EXAMPLE 8

One hundred grams of the liquid nutritional composition of EXAMPLE 2 is placed in a glass beaker and is heated to and remains at a temperature of 285 degrees F. for ten (10) seconds. Precipitate does not form and fall to the bottom of the beaker during the time the composition is heated to 285 degrees F.

EXAMPLE 9

One hundred grams of the liquid nutritional composition of EXAMPLE 3 is placed in a glass beaker and is heated to 285 degrees F. for ten (10) seconds. Precipitate does not form and fall to the bottom of the beaker while the composition is heated to 285 degrees F.

EXAMPLE 10

EXAMPLES 2, 4, 6, 8 are repeated, except that the amount of potassium sorbate in the food composition prepared in EXAMPLE 2 is increased such that the pH of the resulting liquid nutritional composition is about 3.0 instead of about 4.5. The resulting drink has a total acidity of about 6.1. Otherwise, similar results are obtained.

EXAMPLE 11

EXAMPLES 3, 5, 7, 9 are repeated, except that the amount of potassium sorbate in the liquid nutritional composition prepared in EXAMPLE 3 is decreased such that the pH of the resulting liquid nutritional composition is about 5.6 instead of about 4.6. Similar results are obtained.

EXAMPLE 12

EXAMPLES 2, 4, 6, 8 are repeated, except that the amount of citric acid in the liquid nutritional composition of EXAMPLE is reduced to lower the total acidity from 5.8 to about 5.0. Similar results are obtained.

EXAMPLE 13

EXAMPLES 3, 5, 7, 9 are repeated, except that the amount of citric acid in the liquid nutritional composition prepared in EXAMPLE 3 is decreased to lower the total acidity from 5.85 to about 4.5. Similar results are obtained.

The liquid nutritional food composition prepared with retentate in accordance with the invention is ingested at any desired point along the digestive tract, but ordinarily is administered to a patient orally or is tubally fed directly into the patient's stomach. If appropriate, the liquid nutritional composition can be tubally directly fed into the intestinal tract or the esophagus. The patient can, as would be appreciated by those of skill in the art, be a hominid or other appropriate animal.

A liquid food composition or other composition produced in accordance with the invention can be placed in a polymer or other bag and the bag and composition heated together such that temperature of the composition reaches at least about two hundred degrees Fahrenheit for a time sufficient to kill all microorganisms in and sterilize the food composition. Although not necessary, the bag is normally sealed closed prior to heating the bag and composition therein to sterilize the composition. If the composition in the bag is an enteral tube feeding composition, the bag can be provided with means for attaching a tube to the bag to permit the composition to be removed by gravity, by a pump, or by some other mechanism.

Having described my invention in such terms as to enable those skilled in the art to understand and practice it, and having identified the presently preferred embodiments thereof, I claim:

1. A bivariant cheese process comprising the steps of
    (a) providing a supply of milk;
    (b) increasing the acidity of the milk to a pH in the range of about 4.3 to 6.0 to form an sour milk mixture;
    (c) adding enzymes to the sour milk for form curd;
    (d) separating whey from the curd, the whey having a pH in the range of about 4.3 to 6.0 and comprising lactose, water, minerals, and albumin;
    (e) providing a first membrane means which prevents albumin from passing through said membrane means and which permits at least 30% by weight of the total weight percent of lactose and minerals in the whey to pass therethrough;
    (f) directing the whey through said membrane means under pressure to produce
        (i) a first acidic membrane retentate comprised of components which do not pass through the membrane, said retentate having a pH in the range of 4.3 to 6.0 and including at least the majority of said albumin, and
        (ii) a first acidic membrane permeate comprised of components which do pass through the membrane, said permeate including at least 30% of the lactose in the whey;
    (g) maintaining the pH during the passage of the whey through said membrane means such that the pH of said retentate is equal to the pH of the whey;
    (h) providing a second micromembrane means which permits albumin to pass therethrough to produce a substantially sterile solution and which prevents bacteria from passing therethrough;
    (i) directing said retentate through said second membrane means under pressure to produce
        (i) a second retentate, and
        (ii) a second permeate including the majority of albumin in said first retentate;
    (j) heating said second retentate; and,
    (k) combining said heated second retentate with said second permeate.

2. A bivariant biunial cheese comprising the steps of
    (a) providing a supply of milk;
    (b) increasing the acidity of the milk to a pH in the range of about 4.3 to 6.0 to form an sour milk mixture;
    (c) adding enzymes to the sour milk for form curd;
    (d) separating whey from the curd, the whey having a pH in the range of about 4.3 to 6.0 and comprising lactose, water, minerals, and albumin;
    (e) providing a first membrane means which prevents albumin from passing through said membrane means and which permits at least 30% by weight of the total weight percent of lactose and minerals in the whey to pass therethrough;
    (f) directing the whey through said membrane means under pressure to produce
        (i) a first acidic membrane retentate comprised of components which do not pass through the membrane, said retentate having a pH in the range of about 4.3 to 6.0 and including at least the majority of said albumin, and
        (ii) a first acidic membrane permeate comprised of components which do pass through the membrane, said permeate including at least 30% of the lactose in the whey;

(g) maintaining the pH during the passage of the whey through said first membrane means such that the pH of said retentate is equal to the pH of the whey;

(h) providing a second membrane means which prevents albumin from passing therethrough;

(i) directing said first retentate through said second membrane means under pressure to produce a second retentate including a greater concentration of albumin than said first retentate;

(j) maintaining the pH during the passage of the first retentate through the second membrane means such that the pH of the second retentate is substantially equal to the pH of the first retentate.

3. A bivariant biunial whey treatment process comprising the steps of (a) providing a supply of whey, the whey having a pH in the range of about 4.3 to 6.0 and comprising lactose, water, minerals, and albumin;

(b) providing a first membrane means which prevents albumin from passing through said membrane means and which permits at least 30% by weight of the total weight percent of lactose and minerals in the whey to pass therethrough;

(c) directing the whey through said membrane means under pressure to produce (i) a first acidic membrane retentate comprised of components which do not pass through the membrane, said retentate having a pH in the range of 2.0 to 6.0 and including at least the majority of said albumin, and (ii) a first acidic membrane permeate comprised of components which do pass through the membrane, said permeate including at least 30% of the lactose in the whey;

(d) adding an acidic composition during the passage of the whey through said first membrane means to lower the pH of said retentate;

(e) providing a second membrane means for concentrating albumin;

(f) directing said first retentate through said second membrane means under pressure to produce a liquid filtration composition having a greater concentration of albumin that said first retentate;

(g) adding an acidic composition during the passage of said first retentate through said second membrane means to lower the pH of said liquid filtration composition.

4. The process of claim 3 comprising the additional step after step (g) of adding supplements to said liquid filtration composition to produce a liquid anti-microbial protein composition, said concentration of albumin in said liquid filtration composition being great enough such that when said supplements are added to said liquid filtration composition the concentration of albumin in the resulting anti-microbial protein composition is less than said concentration of albumin in said liquid filtration composition and is in the range of about 0.5 to 12.0 percent by weight.

* * * * *